US010129447B2

(12) United States Patent
Eldredge et al.

(10) Patent No.: US 10,129,447 B2
(45) Date of Patent: Nov. 13, 2018

(54) MASS DIGITIZATION SYSTEM

(71) Applicant: BRIGHAM YOUNG UNIVERSITY, Provo, UT (US)

(72) Inventors: Scott Jamison Eldredge, Provo, UT (US); Marc Killpack, Provo, UT (US); Daniel Merlin Carpenter, Provo, UT (US); Andrew Willis Hibbard, Provo, UT (US); Kristy Marie Kohlert, Provo, UT (US); Janel Lyn Mayfield, Provo, UT (US); Derek Graham Alexander Sacks, Provo, UT (US); Andrew Price Jackson Stanley, Provo, UT (US); Scot Broadbent Wilcox, Provo, UT (US)

(73) Assignee: Brigham Young University, Provo, UT (US)

( * ) Notice: Subject to any disclaimer, the term of this patent is extended or adjusted under 35 U.S.C. 154(b) by 279 days.

(21) Appl. No.: 15/049,690

(22) Filed: Feb. 22, 2016

(65) Prior Publication Data

US 2016/0247281 A1    Aug. 25, 2016

Related U.S. Application Data

(60) Provisional application No. 62/297,440, filed on Feb. 19, 2016, provisional application No. 62/118,996, filed on Feb. 20, 2015.

(51) Int. Cl.
*G06T 7/00* (2017.01)
*H04N 5/225* (2006.01)

(52) U.S. Cl.
CPC ................. *H04N 5/2256* (2013.01)

(58) Field of Classification Search
None
See application file for complete search history.

(56) References Cited

U.S. PATENT DOCUMENTS

| 3,608,462 | A | * | 9/1971 | Groshong | ............. A61B 5/103 108/147 |
| 5,245,411 | A | | 9/1993 | Dury | |
| 5,838,569 | A | | 11/1998 | Gane | |
| 6,969,033 | B2 | * | 11/2005 | van der Linden | ..... F16M 11/08 108/4 |
| 7,262,783 | B2 | * | 8/2007 | Kramer | ..................... G06F 3/14 345/619 |
| 7,561,310 | B2 | | 7/2009 | Joyce | |
| 7,710,391 | B2 | | 5/2010 | Bell et al. | |
| 7,855,732 | B2 | * | 12/2010 | Williams | ............ G06F 3/04812 348/211.7 |
| 9,208,571 | B2 | | 12/2015 | Evertt et al. | |

(Continued)

*Primary Examiner* — Kate H Luo
(74) *Attorney, Agent, or Firm* — Brake Hughes Bellermann LLP

(57) ABSTRACT

A mass digitization system may include a work surface rotatably coupled to a support structure, and a motor coupled to the work surface to selectively rotate the work surface. An imaging station may be positioned proximate the work surface to capture digital images of items on a receiving surface of the work surface. The motor may rotate the work surface and the imaging station may include an imaging device to capture images of items on the receiving surface as the items are positioned in the image capture area of the imaging device.

18 Claims, 15 Drawing Sheets

(56) References Cited

U.S. PATENT DOCUMENTS

| | | | |
|---|---|---|---|
| 2001/0053284 A1* | 12/2001 | Shin | G06T 15/20 |
| | | | 396/5 |
| 2004/0114792 A1* | 6/2004 | Fukui | G06T 7/0004 |
| | | | 382/141 |
| 2005/0233064 A1* | 10/2005 | Tsuno | B81C 3/008 |
| | | | 427/8 |
| 2006/0147188 A1* | 7/2006 | Weng | F16M 11/046 |
| | | | 396/5 |
| 2008/0267007 A1* | 10/2008 | Bressani | B01F 9/0014 |
| | | | 366/211 |
| 2011/0181715 A1* | 7/2011 | Eales | G01B 11/2433 |
| | | | 348/142 |
| 2015/0054918 A1* | 2/2015 | Lee | H04N 13/0221 |
| | | | 348/46 |

* cited by examiner

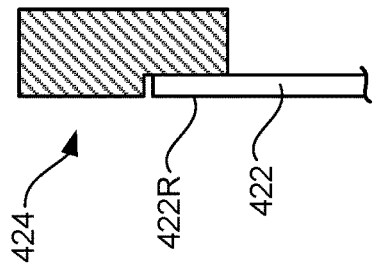
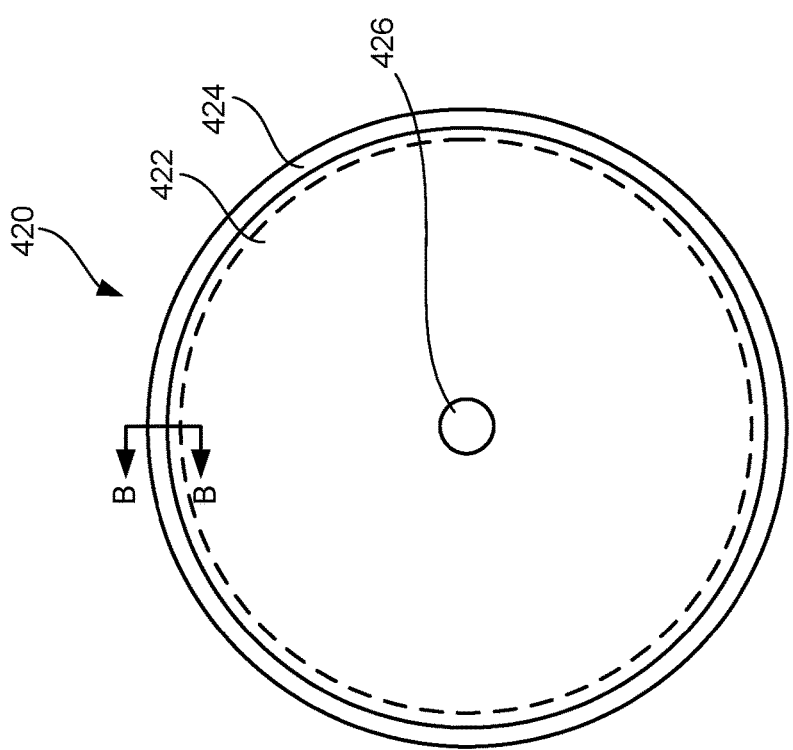
FIG. 3D
FIG. 3C

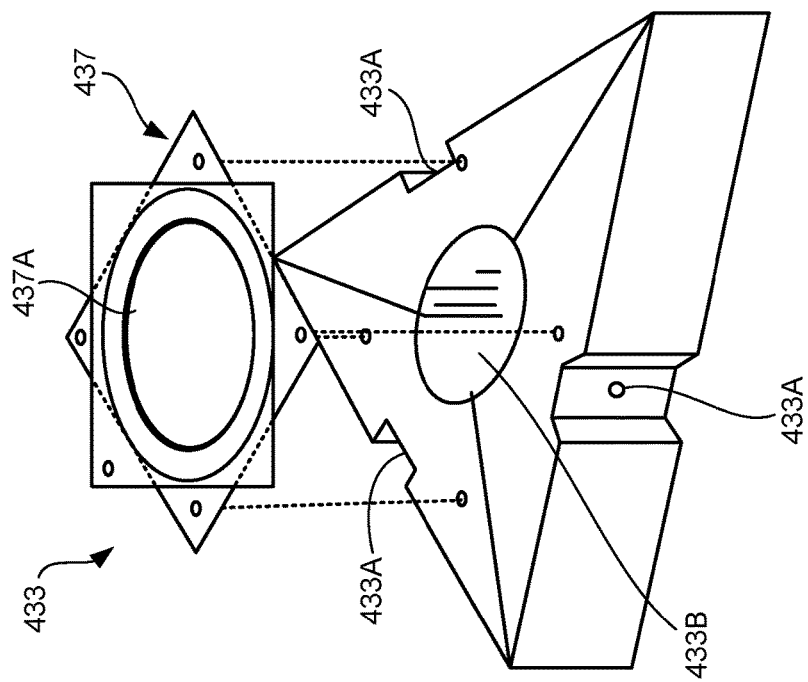
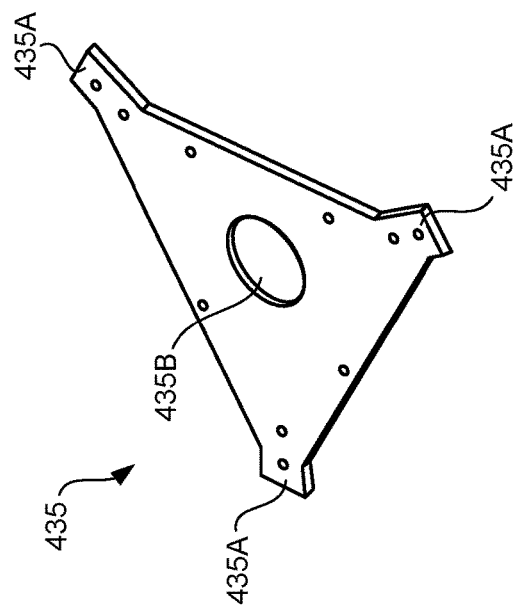
FIG. 5
FIG. 4

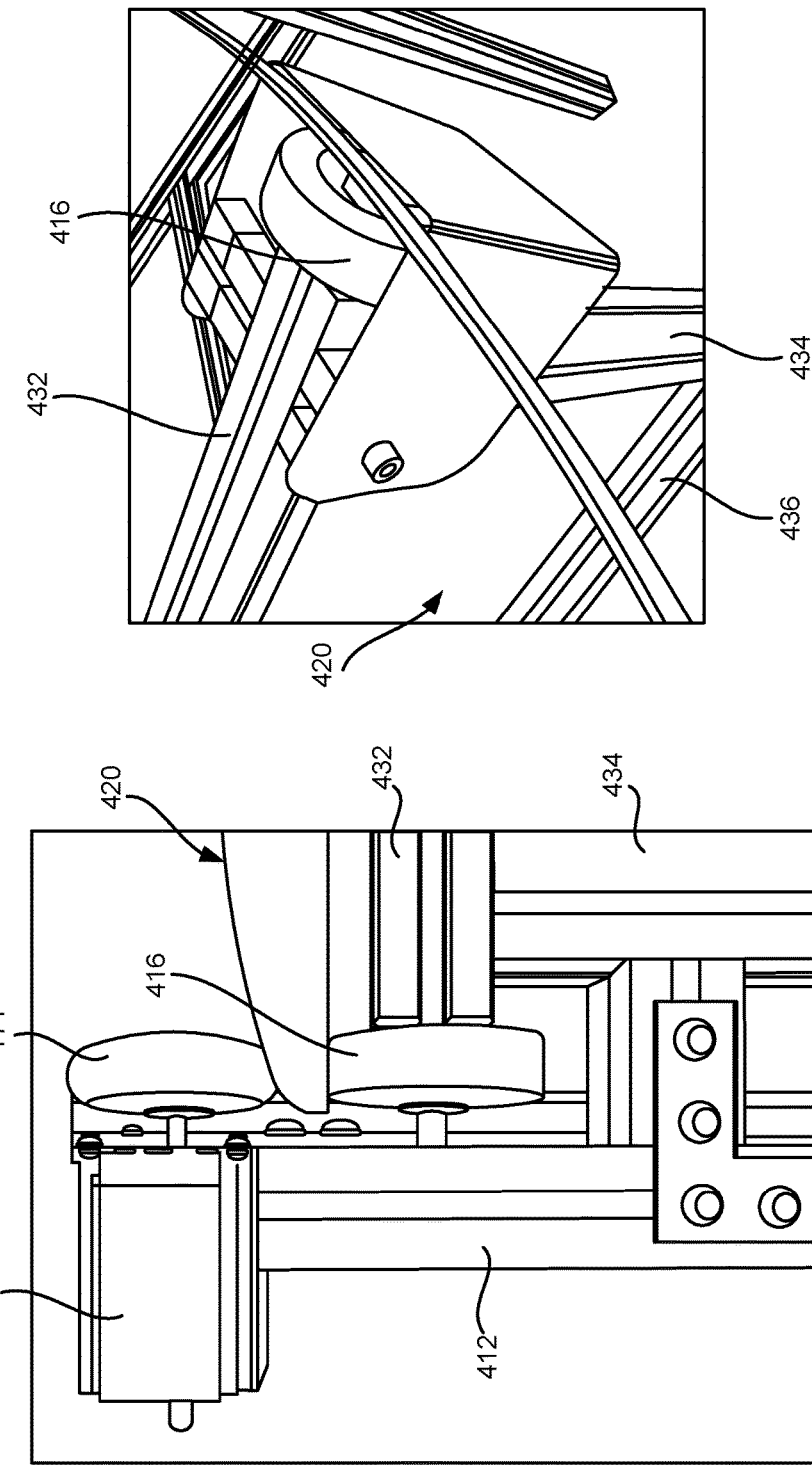

MASS DIGITIZATION SYSTEM

CROSS REFERENCE TO RELATED APPLICATIONS

This application claims priority to provisional Application Ser. No. 62/118,996, filed on Feb. 20, 2015, and to provisional Application Ser. No. 62/297,440, filed on Feb. 19, 2016, the entirety of these applications being incorporated by reference as if fully set forth herein.

FIELD

This document relates, generally, to a mass digitization system, and in particular, to a system for mass digitization of archival materials.

BACKGROUND

Many institutions have relatively large collections of archival and/or legacy type materials which these institutions may choose to photograph and/or digitize for storage and remote database access. Digitization of these types of materials may be complicated and time consuming due to, for example, specialized handling requirements, material condition, non-standard sizing, non-standard shape and contouring, and the like. In some situations, digitization of these types of materials may be done by offsite commercial scanning facilities, using relatively high cost equipment, and requiring that the materials leave the institution.

BRIEF DESCRIPTION OF THE DRAWINGS

FIGS. 3A-3E are perspective views of a support structure and a hood structure of a mass digitization system, in accordance with implementations described herein;

FIG. 4 illustrates a lower central bracket of the support structure shown in FIG. 3A, in accordance with implementations described herein.

FIG. 5 illustrates an upper central bracket and central bearing of the support structure shown in FIG. 3A, in accordance with implementations described herein.

FIGS. 6A-6B illustrate a drive system of a mass digitization system, in accordance with implementations described herein.

DETAILED DESCRIPTION

Figure 1A:
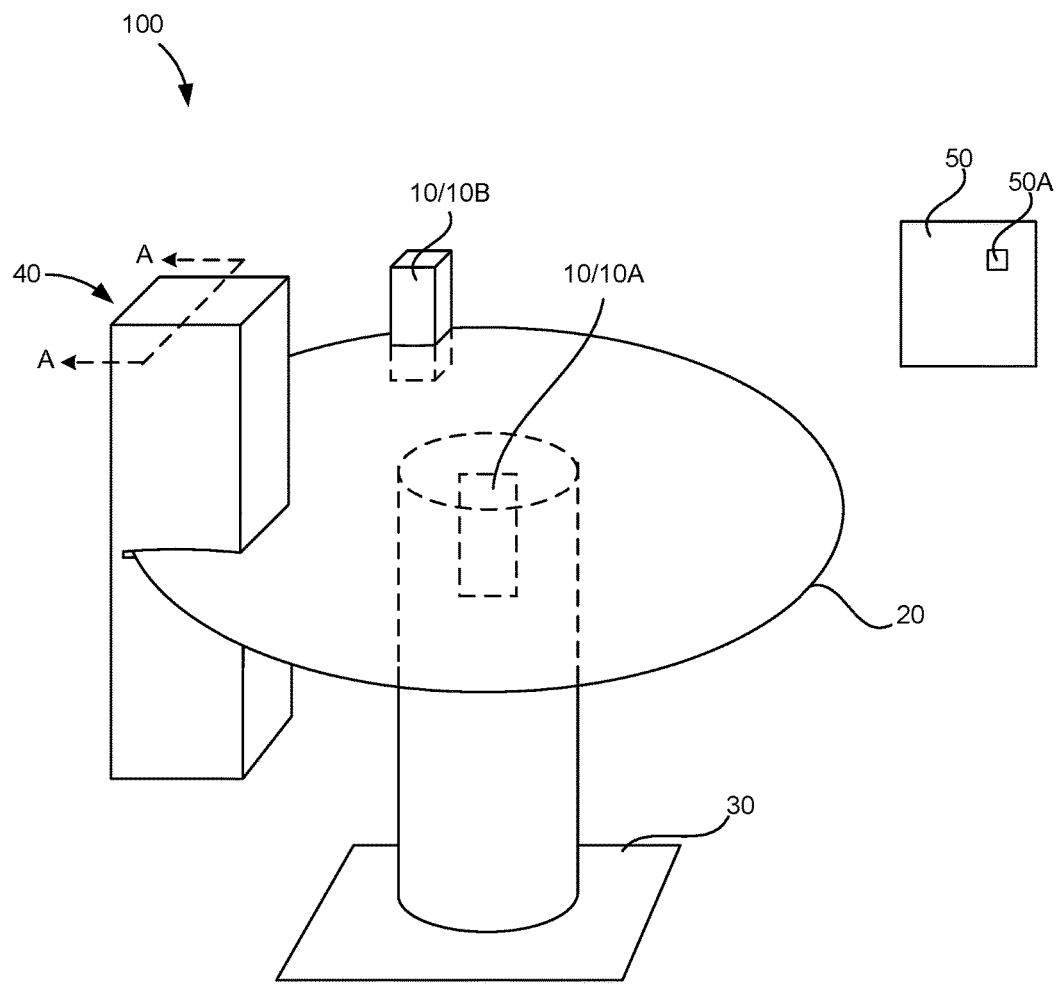
FIG. 1A is a perspective schematic view and FIG. 1B is a top schematic view of an example implementation of a mass digitization system, in accordance with implementations described herein.
Figure 1B:
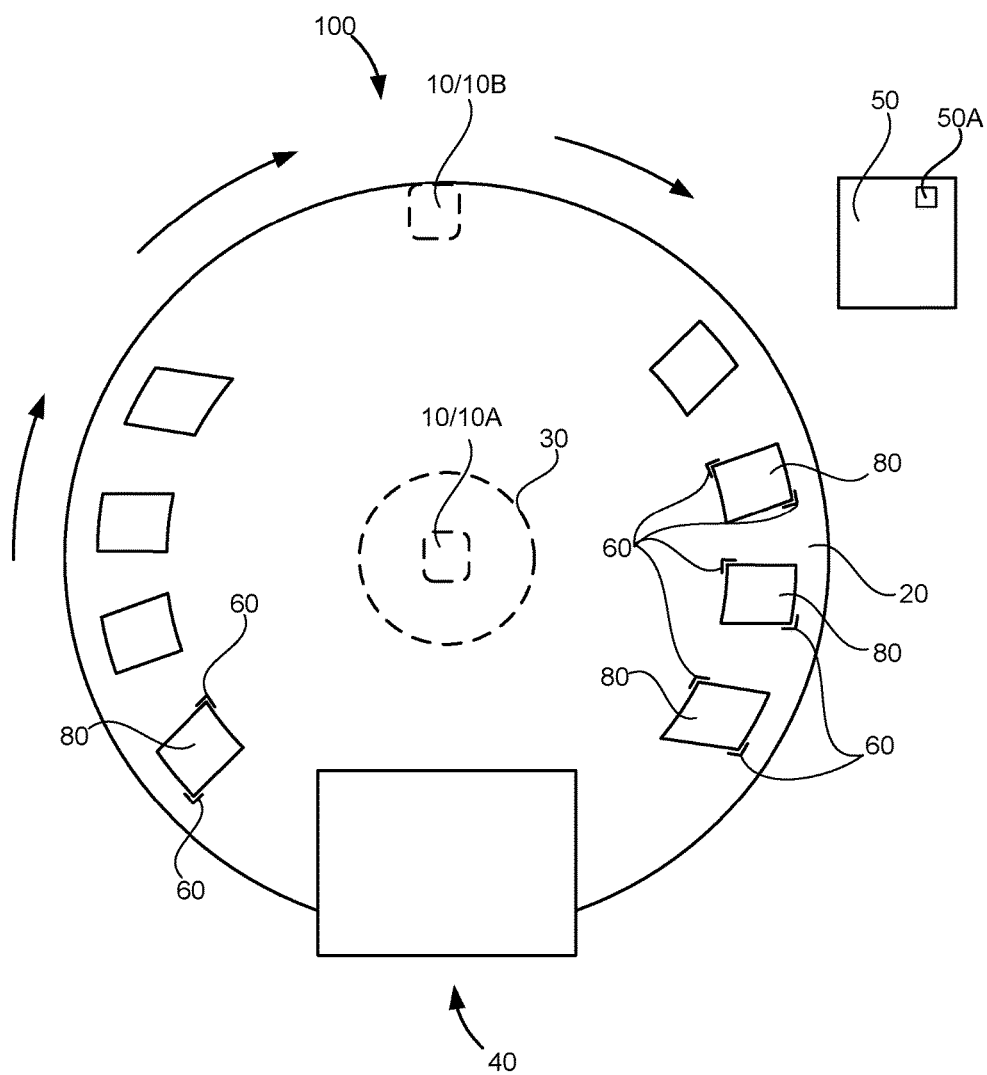

A motorized system for high-speed digitization and/or image capture/photography of cultural heritage, legacy, archival and other types of materials is shown in FIGS. 1A and 1B. The system 100 may be applied not just to printed, manuscript, photographic materials and the like associated with these types of institutions, but with a wide range and variety of different types of collection materials. In particular, the system 100 may be configured to accommodate collection materials which do not lend themselves to digitization by typical automated, or non-automated, scanning systems due to, for example, size, shape, condition, transparency/opacity and the like. For example, in some implementations, the system 100 may accommodate not just two-dimensional, document type items, but also three-dimensional archival items for digitization.

An example implementation of a mass digitization system 100, in accordance with implementations described herein, is shown in FIGS. 1A and 1B. The system 100 may include a work surface 20, or tabletop 20, movably supported on a support structure 30. In the example implementation shown in FIGS. 1A-1B, the work surface 20 is circular (e.g., substantially circular), and the support structure 30 is essentially a pedestal supporting a tabletop type structure. However, the work surface 20 may be a variety of different shapes, and the support structure 30 may include other types of structures (to be discussed in more detail hereinafter) capable of providing support to the work surface, and capable of supporting stable movement of the work surface 20. The work surface 20 may be made of a variety of different materials, including, for example, a transparent or translucent material that allows light to pass through, or an opaque material that essentially blocks light from passing through. The system 100 may be configured to receive a variety of different work surfaces 20, having different sizes, shapes, and materials, making the different work surfaces 20 interchangeable to accommodate the specific needs of a particular archival item to be digitized.

The work surface 20 may be moved, for example, rotated, by a motor 10. In some implementations, the motor 10 may include a first motor 10A and/or a second motor 10B. In some implementations, the first motor 10A may be housed in, or otherwise included on or near the support 30, such that the first motor 10A is coupled to a central portion of the work surface 20. In some implementations, the second motor 10B may be coupled to an edge portion of the work surface 20 to provide for rotation of the work surface 20. In some implementations, the system 100 may include both the first motor 10A and the second motor 10B, and the first and second motors 10A and 10B may be cooperatively controlled, or independently controlled, depending on, for example, characteristics of items received on the work surface 20 for digitization, rotation speeds of the work surface 20, amount of rotational force generated by the first motor 10A and/or the second motor 10B, and other such factors. In some implementations, the system 100 may include only the first motor 10A, or only the second motor 10B. Hereinafter, simply for ease of discussion and illustration, references to the motor 10 will be considered to include both the first motor 10A and the second motor 10B, or only the first motor 10A, or only the second motor 10B.

The system 100 may also include an imaging station 40 positioned so that, as an archival item received on the work surface 20 is positioned in a viewing area of the imaging station 40, the imaging station 40 may capture an image of the item. In some implementations, the motor 10 and components of the imaging station 40 may be controlled in response to commands received at a workstation 50 including a processor 50. The workstation 50 may be operably coupled to the motor 10 and to the various components of the imaging station 40, and may communicate and exchange data/information with the motor 10 and the various components of the imaging station 40 to allow for operation, control, adjustment and the like of the motor and other components via a user interface at the workstation 50, and processing of information received from the motor 10 and the various components by the processor 50A of the workstation 50. For example, in some implementations, the components of the imaging station 40 may be automatically controlled based on information detected by sensors positioned at and/or near the imaging station 40.

FIGS. 2A-2F are sectional views of the system 100, taken at the imaging station 40, along line A-A shown in FIG. 1A. The imaging station 40 may include a hood 42 defining a digitization area 40A together with the work surface 20. The hood 42 may surround (or partially surround) an item 80 positioned within the field of view of the imaging station 40 for digitization. An imaging device 44 (or multiple imaging devices of various types) including a processor 44A for processing image information captured by the imaging device 44 and transmitting the captured images to the workstation 50, may be included in the digitization area 40A, for example, coupled to the hood 42. The imaging device 44 may be, for example, a camera, such as a charge-coupled device (CCD) camera. A first light source 46, including one or more individual light sources, may be included in the digitization area 40A, for example, coupled to the hood 42 so that the first light source(s) 46 do not obstruct movement of the work surface 20, to illuminate the item 80 to be digitized. The hood 42 may block (e.g., substantially block, entirely block) ambient light from entering into the digitization area 40A, so that light within the digitization area 40A may be closely controlled through operation of the first light source 46. This may improve quality of the digital scan of the item 80 captured by the camera 44.

Figure 2A:
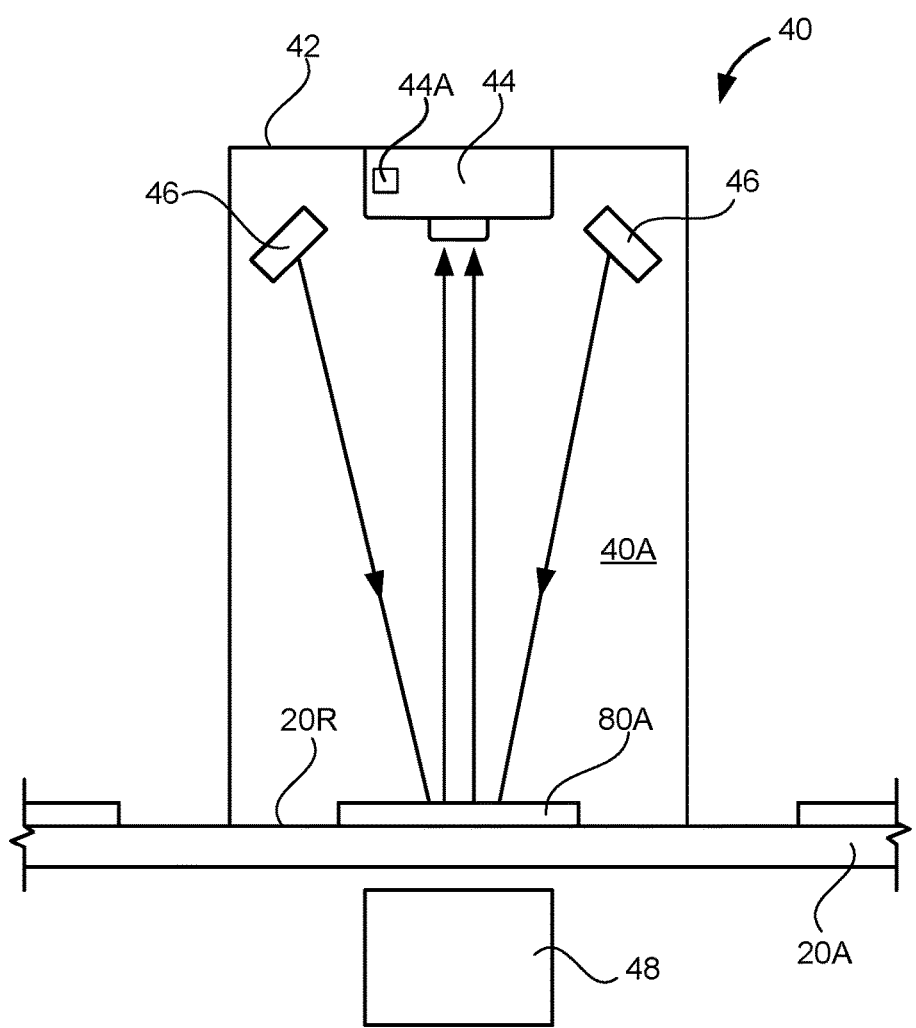
FIGS. 2A-2F are cutaway views of examples of an imaging device of the mass digitization system shown in FIGS. 1A-1B, in accordance with implementations described herein.

In the example shown in FIG. 2A, the work surface 20A is made of an opaque material. Light generated by the first light source(s) 46 may be directed into the digitization area 40A, and in particular, onto an item, for example, a nontransparent item 80A, to be digitized, with relatively little to no ambient light entering the digitization area 40A, and with little to no reflection of light within the digitization area 40A defined by the hood 42. In this arrangement, an amount of light in the digitization area 40A may be set, for example, at the workstation 50, or automatically based on information collected by sensors in the digitization area 40A (to be described below), based on, for example, a size, shape, shading/coloring, sensitivity, type of the item 80A to be digitized, a required resolution of the digital image to be captured, a resolution capability of the camera 44, and other such factors.

Figure 2B:
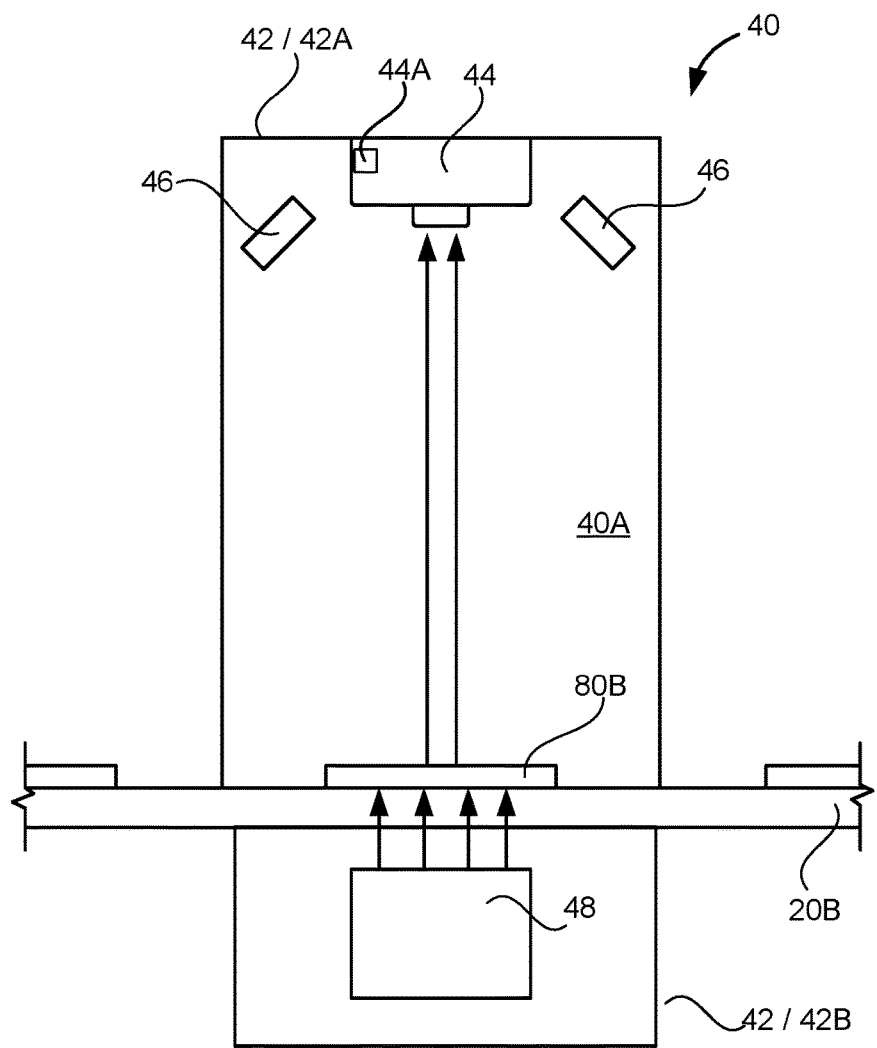

In the example shown in FIG. 2B, the work surface 20B may be made of a translucent material (or a semi-transparent material), allowing light to be directed into the digitization area 40A by a second light source 48. This backlighting may allow a transparent, or reflective, item 80B to be digitized. As shown in FIG. 2B, the second light source 46 may be positioned below the translucent work surface 20B. The second light source 48 may direct light toward the item 80B to be digitized from the back side of the item 80B (the side of the item 80B contacting a receiving surface 20R of the translucent work surface 20B), to provide backlighting of the transparent item 80B to be digitized. Transparent items to be digitized may include, for example, glass slides, glass plate negatives and the like. As shown in FIG. 2B, in some implementations, the hood 42 may include an upper hood 42A and a lower hood 42B. The lower hood 42B may be positioned adjacent to a lower surface of the translucent work surface 20B to block (e.g., substantially block or entirely block) ambient light from entering the digitization area 40A from the under side of the work surface 20B due to the transmissivity of the translucent work surface 20B. This may allow for more precise control of light levels in the digitization area, and may prevent unwanted reflection of light within the digitization area 40A. Backlighting of these types of transparent items in this manner may dramatically improve the quality of digitization of these types of transparent items. In this arrangement, an amount of light in the digitization area 40A may be set, for example, through the workstation 50, or automatically, based on information collected by sensors in the digitization area 40A (to be described below), based on, for example, a size, shape, shading/coloring, sensitivity, type of the item 80B to be digitized, a required resolution of the digital image to be captured, a resolution capability of the camera 44, and other such factors.

Figure 2C:
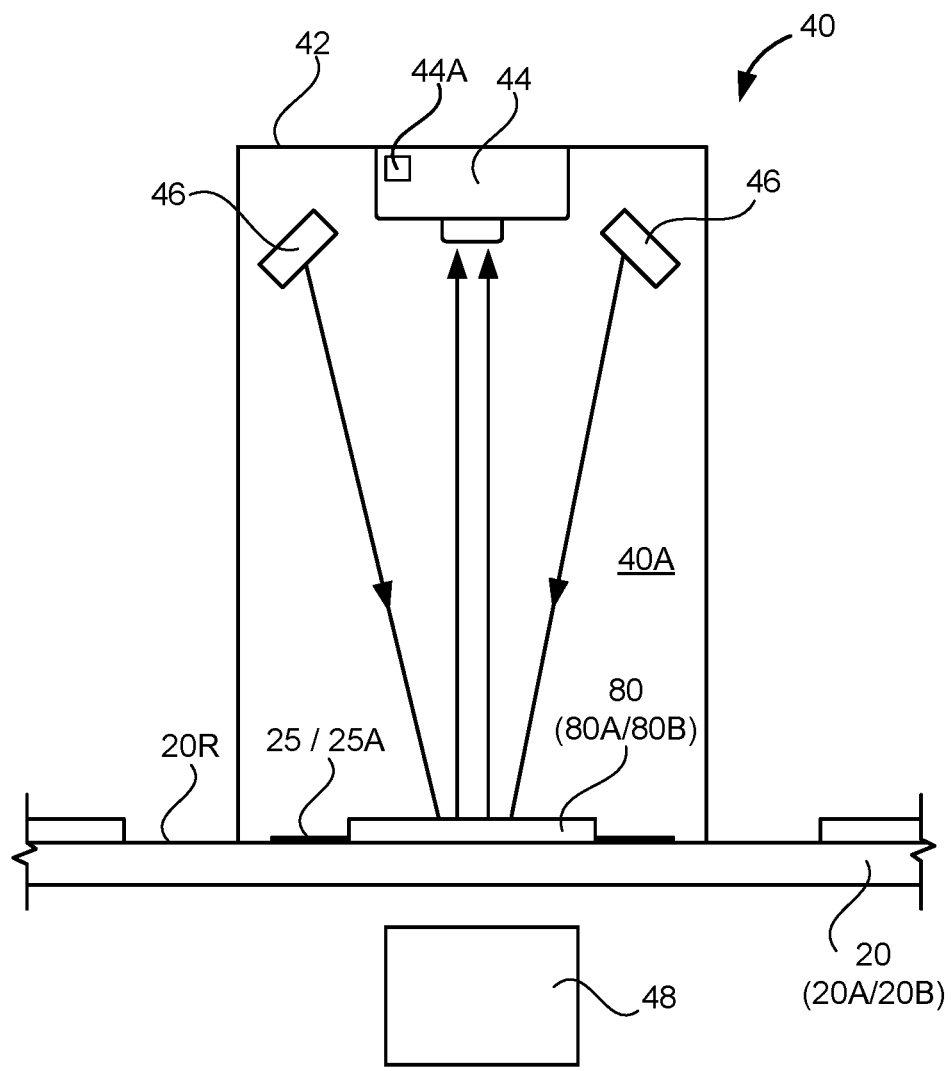
Figure 2D:
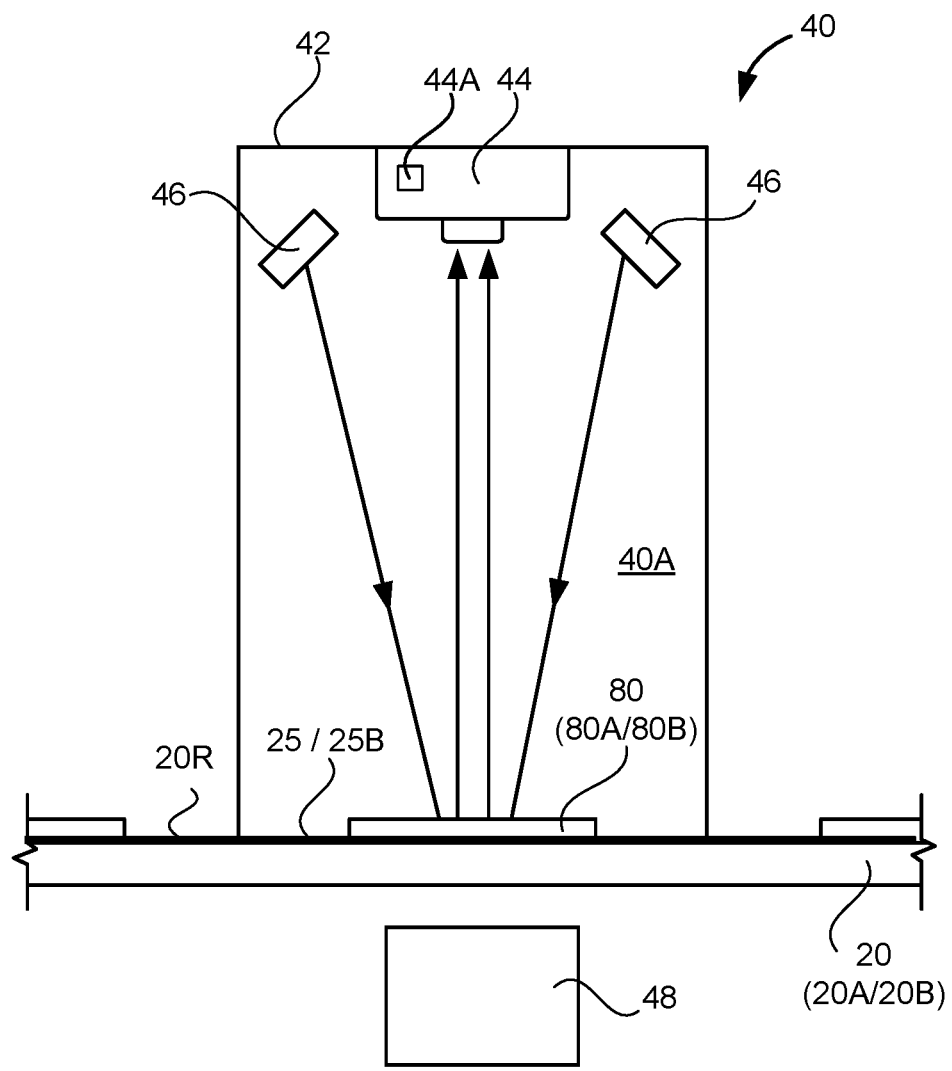

As shown in FIG. 2C, in some implementations, a mat 25A, or receiving tray positioned on the translucent work surface 20B may facilitate and improve digitization of non-transparent items 80A, which do not require backlighting, when the system 100 is fitted with the translucent work surface 20B. The mat 25A may be made of a substantially opaque material, such as, for example, neoprene, and may be positioned on the receiving surface 20R of the translucent work surface 20B to reduce reflection of light emitted by the first light source(s) 46 due to the transparent work surface 20B and improve digitization quality. In some implementations, the mat 25A may include openings in which the item(s) 80A may be received, so that the outer periphery of the item 80A is surrounded by an inner periphery of the opening in the mat 25A. In some implementations, the mat 25B may be positioned on the receiving surface 20R of the translucent work surface 20B, for example, covering substantially most or all of the receiving surface 20R of the translucent work surface 20B, as shown in FIG. 2D, and then the item(s) 80A may be positioned on top of the mat 25B. In the example implementations shown in FIGS. 2C and 2D, the mats 25A/25B are described with respect to use on the receiving surface of the translucent work surface 20B, and thus may eliminate the need for a lower hood 42B to inhibit ambient light from entering the digitization area 40A due to the transmissivity of the translucent work surface 20B. In some implementations, the mats 25A/25B may be positioned on the receiving surface of the opaque work surface 20A, to reduce or substantially eliminate slippage of items 80 (for example, opaque items 80A not necessarily requiring backlighting) positioned on the mats 25A/25B.

In some implementations, the receiving surface 20R of the work surface 20 may be marked, so that items 80 to be digitized may be accurately placed and aligned within the digitization area 40A. For example, in some implementations, the receiving surface 20R may be temporarily marked with a removable media, such as, for example, a grease pen, tape and the like. Registration marks 60 (see FIG. 1B) on the receiving surface 20R of the work surface 20 may be used, for example by an operator of the workstation 50, or by a sensor of the imaging station (to be described in more detail below), to determine, for example, a position of the item 80 to be digitized, when to control the motor 10 to stop rotation of the work surface 20 so that the item 80 is properly aligned within the field of view of the camera 44 within the digitization area 40A, to clearly define optical edges of the item 80 to be digitized, and the like.

Figure 2E:
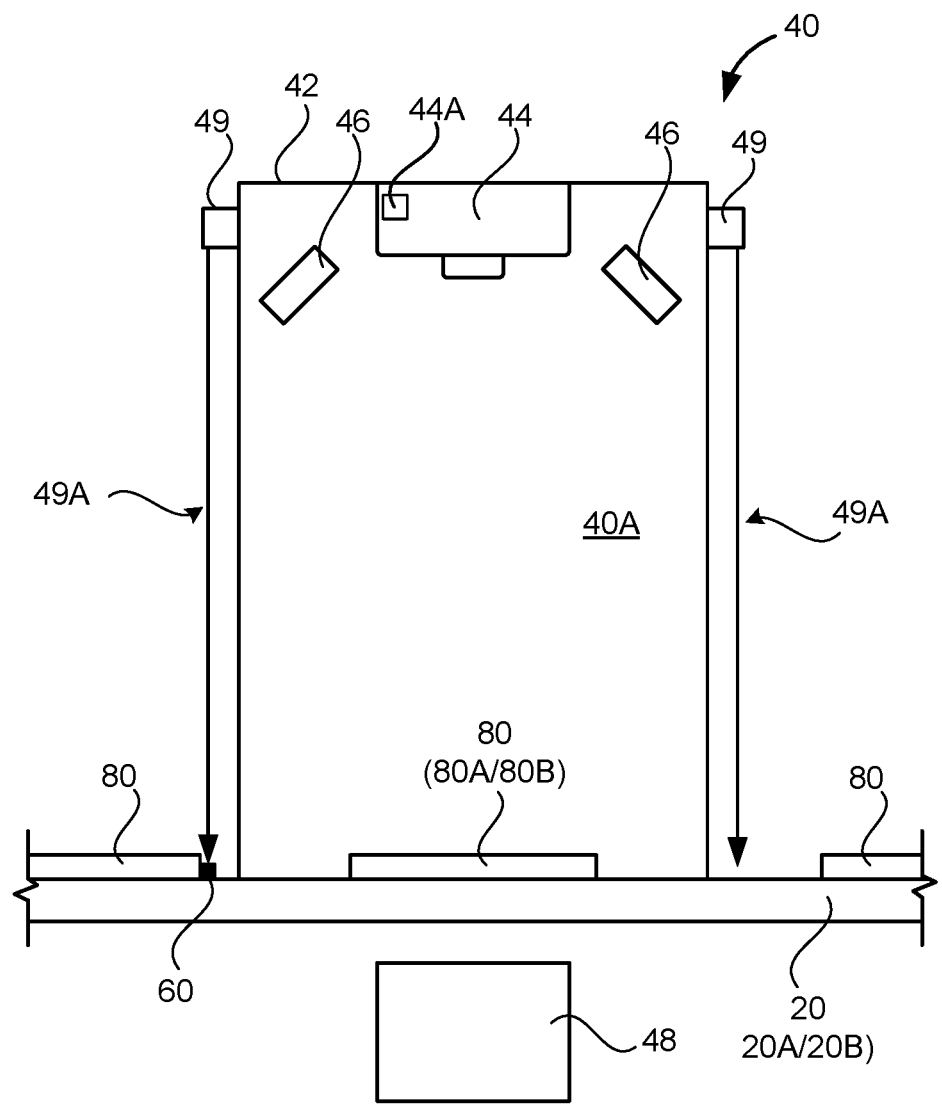

As shown in FIG. 2E, in some implementations, the imaging station 40 may include one or more laser light sources 49, for example, coupled to a periphery of the hood 42. The laser light source(s) 49 may emit a beam 49A down onto the work surface 20. The beam 49A emitted by the laser light source(s) 49 may provide a visual indicator marking alignment with registration marks 60 on the work surface 20. In some implementations, when digitizing a sequential arrangement of items, the beam emitted by the laser light source(s) 49 may be aligned with an edge portion of a subsequent item 80 to be digitized to properly align and position the subsequent item 80 for entry into the digitization area 40A. In some implementations, detection of the registration marks 60 in this manner may provide an indication to, for example, the camera 44 that the next item 80 is entering the digitization area 40, and the system 100 may initiate an automated item detection sequence in which the item 80 may be detected as it enters the digitization area 40A, the camera 44 may initiate an automated focusing sequence, and lighting in the digitization area 40 may be automatically adjusted to achieve the desired image quality.

Figure 2F:
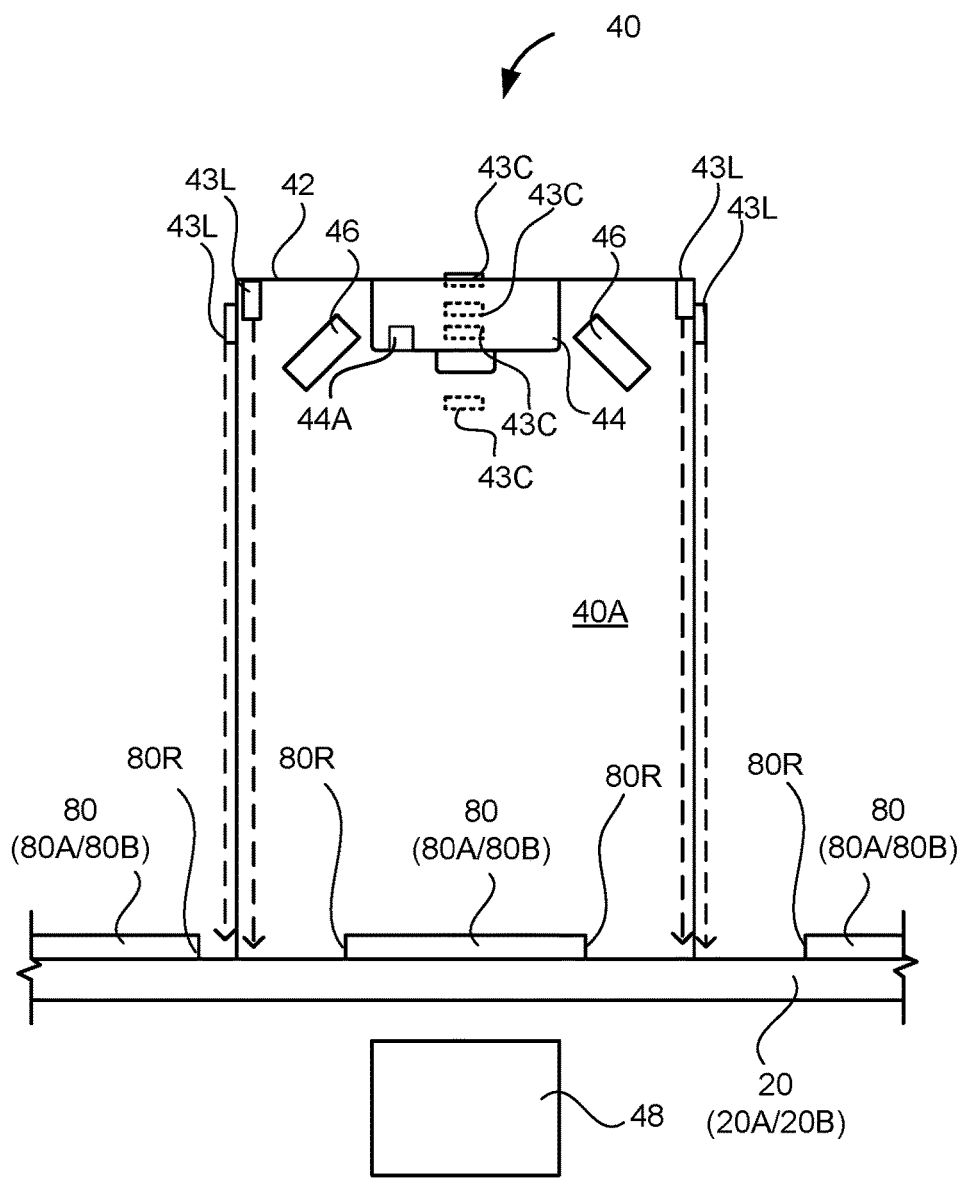

As shown in FIG. 2F, in some implementations, one or more optical sensors 43 may be positioned at, or near the hood 42. For example, one or more optical sensors 43L may be positioned on outer lateral peripheral portion(s) of the hood 42, or inside the hood 42, facing into the digitization area 40A. One or more optical sensor(s) 43C may be positioned on outer central peripheral portion(s) of the hood 42. The optical sensor(s) 43C positioned on the outer central peripheral portion(s) of the hood 42 may be positioned and oriented so as to provide optical coverage and detection capability across the area of the work surface 20 outside of the hood 42. These optical sensor(s) 43C may be positioned and oriented to, for example, detect an item as soon as it is positioned on the work surface 20, and/or to detect changes in position and orientation of the item 80 as the work surface 20 rotates due to, for example, slipping and shifting of the item 80 on the work surface 20, as well as changes in position and orientation as the item 80 approaches the hood 42 simply associated with the rotation of the work surface 20. In some implementations, these sensor(s) 43C may also detect disruptions in work flow due to, for example, user interaction with one of the items 80 positioned on the work surface 20 and the like.

The one or more optical sensor(s) 43L positioned on the outer lateral portion(s) and/or interior of the hood 42 may detect items 80 entering into the digitization area 40A and/or leaving the digitization area 40A. These optical sensor(s) 43L may detect, for example, a position, orientation, size, shape and the like of the item 80 entering the digitization area 40A, based on, for example, detection of edges 80R of the items 80 as they move toward the hood 42 and into the digitization area 40A. Information associated with the item 80 entering the digitization are 40A collected by the optical sensor(s) 4L3/43C may be utilized by software controlling the camera 44 and/or the light source(s) 46 to, for example, initiate a focusing sequence, adjust lighting in the digitization area 40A, and the like.

Information collected by the optical sensor(s) 43L/43C may be used to control rotation of the work surface 20 from the point at which an item 80 is initially positioned on the work surface 20, until the item 80 is accurately positioned within the digitization area 40A and under the imaging device 44, in a closed loop feedback control system. Information collected by the optical sensor(s) 43L/43C may also be used to adjust alignment/focus of the imaging device 44, adjust an orientation and an amount of light directed toward the item 80 by the light source(s) 46/48 and the like to achieve desired digitization quality, and to control rotation of the work surface 20 to direct the item 80 to an unloading position for removal from the work surface 20 after digitization is complete.

The example implementations illustrated in FIGS. 2D-2F have been described with respect to an item 80 positioned on the work surface 20. The features described above may be applied to use with either the opaque work surface 20A or the translucent work surface 20B, and with either an opaque item 80A or a transparent item 80B, and with or without a mat 25A/25B.

In some implementations, the camera 44 may be operably coupled to communicate with the workstation 50, so that an operator of the workstation 50 may control the motor and rotate the work surface 20 based on an image of the item 80 in the digitization area 40A displayed on a display of the workstation 50. In some implementations, the work surface 20 may be rotated manually. In some embodiments, the work surface 20 may be rotated automatically, based on, for example, an automatic image detection process carried out based on sensor information detected at the imaging station 40, image to image reconciliation performed by the components of the imaging station 40 and/or the workstation 50, and other such processes.

In some situations, items to be digitized may include a variety of different sizes, shapes, materials, sensitivities to light, fragility and the like. In this instance, the system 100 may be capable of accommodating the different needs associated with the items to be digitized. In some situations, items to be digitized may include a sequence of like items, such as, for example, numerous (sequential) pages of a document having essentially the same or similar size, shape, condition, handling requirements, lighting requirements and the like. In this instance, the system 100 may be programmed to automatically digitize an item, automatically rotate the work surface 20 until the next item is properly aligned in the digitization area 40A, and carry out this automated process until the full sequence of items is digitized, requiring only manual removal of digitized items and manual positioning of new items to be digitized on the work surface 20 as the work surface 20 rotates.

Figure 3B:
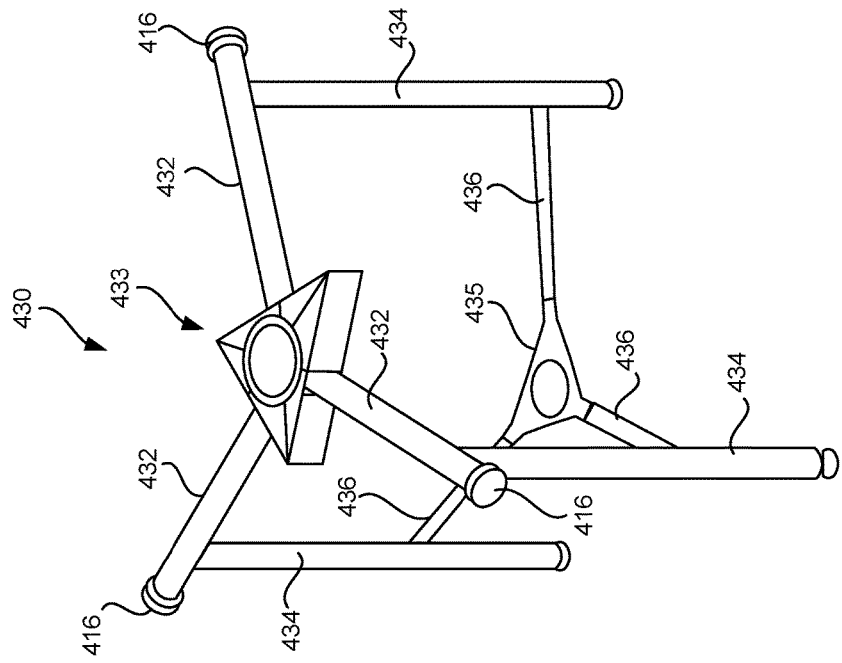
Figure 3A:
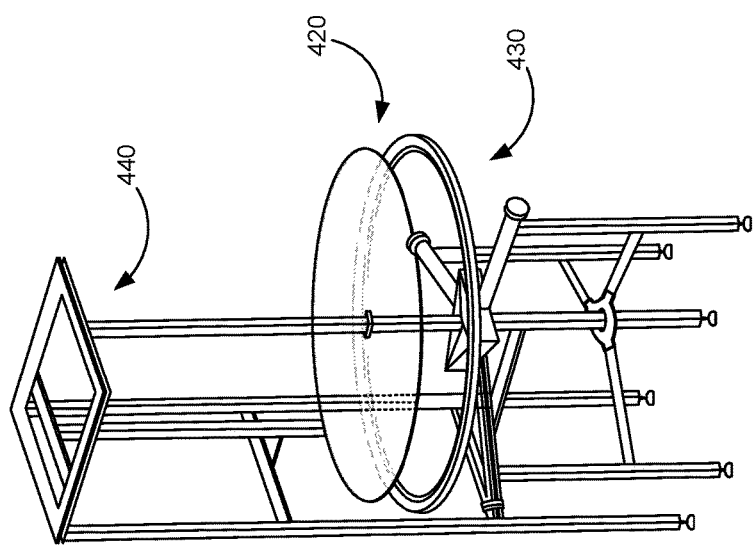

FIG. 3A is a perspective view of a support structure 430, a hood structure 440, and a work surface structure 420 of a mass digitization system, in accordance with an example implementation as described herein. As shown in FIG. 3B, the support structure 430 may include a plurality of upper frame members 432 each having a first (proximal) end portion coupled to and extending radially outward from an upper central hub bracket 433. Each of the upper frame members 432 may be supported by a leg member 434 coupled to a second (distal) end portion of the respective upper frame member 432. A plurality of lower frame members 436 may each have a first (proximal) end portion coupled to and extending radially outward from a lower central hub bracket 435. A second (distal) end portion of each lower frame member 436 may be coupled to an intermediate portion of a respective leg member 434. This is shown in more detail in the perspective view of the support structure 430 shown in FIG. 3C. In the example implementation shown in FIGS. 3A and 3B, the support structure 430 includes three upper frame members 432, three lower frame members 436, and three leg members 434. However, in some implementations, the support structure 430 may include more than three upper frame members 432, more than three lower frame members 436, and more than three leg members 434 based on, for example, a size and weight of the work surface structure 420 to be supported, footprint limitations in an installation area of the system, and other such factors.

FIG. 3C is a plan view of the work surface structure 420 shown in FIG. 3A, and FIG. 3D is a partial sectional view of the work surface structure 420 taken along line B-B of FIG. 3C. The work surface structure 420 may include a work surface 422, or table top, supported in an outer frame 424. In some implementations, the outer frame 424 may be made of a rigid material such as, for example, a metal material, wood, a resin material and the like, to help maintain planarity of a receiving surface 422R of the work surface 422. As shown in FIG. 3D, an outer peripheral edge portion of the work surface 422 may be supported in a lip area 424A of the outer frame 424. This rigid support of the work surface 422 in the outer frame 424 may reduce or substantially eliminate distortion or warping of the work surface 422 over time, maintaining a substantially planar receiving surface 422R on which items may be received and processed by the system.

Figure 3E:
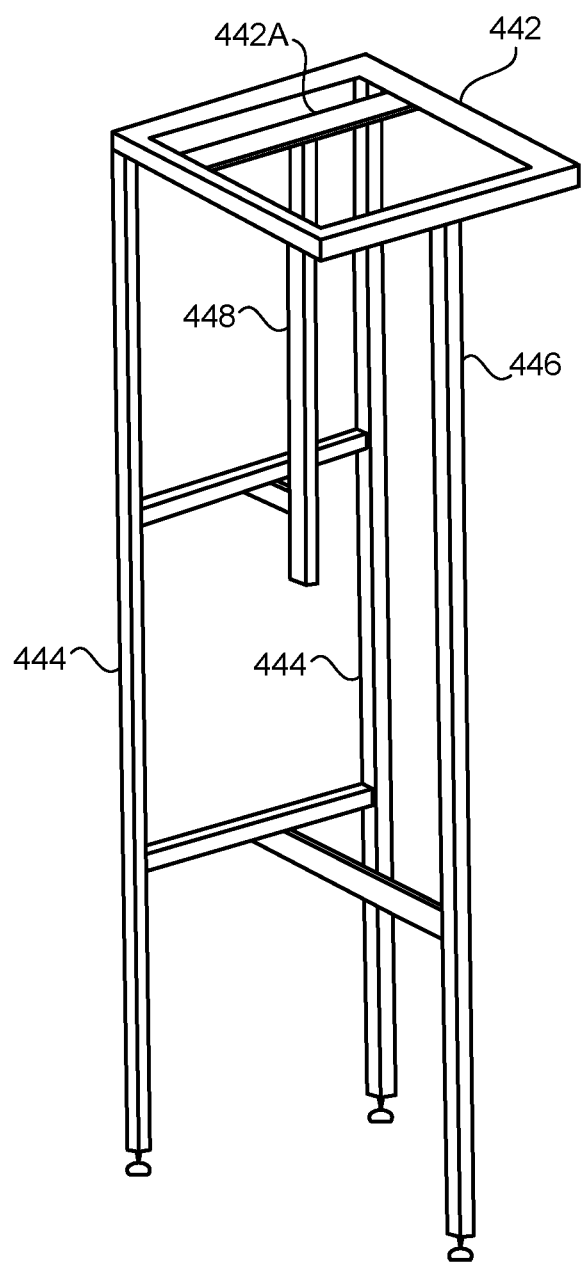

FIG. 3E is a perspective view of the hood structure 440 shown in FIG. 3A. The hood structure 440 may include an upper hood frame 442 defining a top of the hood structure 440, a lateral hood frame 444 extending down from a first side of the upper hood frame 442, and along an outer periphery of the work surface structure 420 and the support structure 430, and a central hood frame 446 extending down, from a second side of the upper hood frame 422, through a central opening 426 in the work surface 420, and through the upper central bracket 433 and the lower central bracket 435 of the support structure 430. A mounting frame 448 may extend downward from a transverse member of the upper hood frame 442 into an interior area defined by the hood structure 440. Various imaging related components such as, for example, a camera, light sources, light sensors and the like, may be mounted on the transverse member 442A and/or the mounting frame 448. Various sensors, such as, for example, the optical sensors described above, may be mounted on the central hood frame 446 and/or the lateral hood frame 444. Mounting of the various optical sensing and imaging related components on the transverse member 442A of the upper hood frame 442 and/or the mounting frame 448 and/or the lateral hood frame 444 and/or the central hood frame 446 may provide access to the components for removal, replacement, adjustment and the like.

In some implementations, the support structure 430 and the hood structure 440 may be made from a relatively rigid material such as, for example, a metal material such as Aluminum and the like, a wood material, a resin material, and other rigid materials. In some implementations, the hood structure 440 may be covered by, for example, an opaque fabric or film like material that can block ambient light from entering the interior area of the hood structure 440. Use of a fabric material to enclose the hood structure 440 may facilitate installation, adjustment, removal and replacement of imaging components installed in the hood structure 440 as necessary. In some implementations, the hood structure 440 may be covered by a more rigid opaque material, such as, for example, metal, plastic or wooden sheeting, attached to the hood structure 440.

Figure 8:
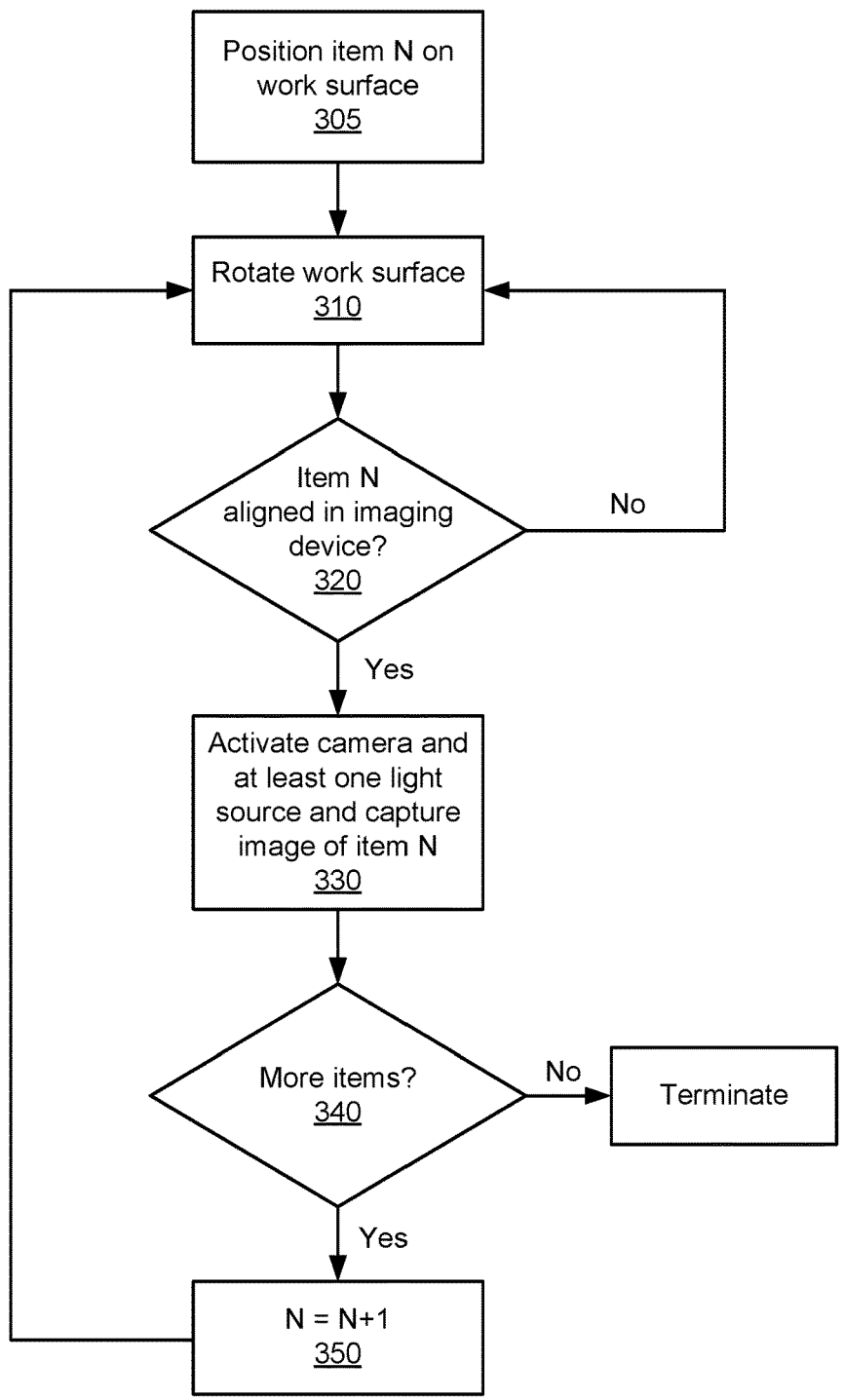
FIG. 8 is a flowchart of an operation of a mass digitization system, in accordance with implementations described herein.

A plan view of the lower central bracket 435 is shown in FIG. 4. The lower central bracket 435 may have a plate shaped form, including a plurality of connection portions 435A arranged around a central opening 435B. Each of the connection portions 435A may connect to the end portion of the respective lower frame member 436. In the example shown in FIG. 4, the lower central bracket 435 includes three connection portions 435A to respectively connect to the three lower frame members 436 shown in FIGS. 3A and 3B. As shown in FIG. 8, the central hood frame 446 may extend through the central opening 435B in the lower central bracket 435, without physically contacting the lower central bracket 435, and without physically contacting the first (proximal) ends of the lower frame members 436, so that vibration in the support structure 430 and/or the work surface structure 420 is not transferred to the hood structure 440 via the central hood frame 446. A number of connection portions 435A included on the lower central bracket 435 may be the same as the number of lower frame members 436, to couple the plurality of lower frame members 436 and plurality of legs 434, and providing for stability of the lower portion of the support structure 430. A diameter of the central opening 435B in the lower central bracket 435 may be greater than a largest outer dimension, or diameter, of the central hood frame 446 of the hood structure 440 that passes through the central opening 435B. This may avoid direct contact between the support structure 430 and the hood structure 440 (in the area of the central hood frame 446 passing through the central opening 435B), isolating the imaging components mounted in the hood structure 440 from any vibration generated due to movement/rotation of the work surface structure 420 supported on the support structure 430.

A perspective view of the upper central bracket 433 is shown in FIG. 5. The upper central bracket 433 may include a plurality of connection portions 433A arranged around a central opening 433B. Each of the connection portions 433A may connect a first (proximal) end portion of the respective upper frame member 432 to the upper central bracket 433. In the example shown in FIG. 5, the upper central bracket 433 includes three connection portions 433A to respectively connect to the three upper frame members 432 shown in FIGS. 3A and 3B. A number of connection portions 433A (which, in this particular example, define recesses) included on the upper central bracket 435 may be the same as the number of upper frame members 432, to couple the plurality of upper frame members 432 and plurality of legs 434, and providing for stability of the upper portion of the support structure 430. A central bearing 437 may be fitted on the upper central bracket 433 to rotatably support the work surface 422 as the work surface structure 420 rotates relative to the support structure 430. A diameter of the central opening 433B in the upper central bracket 433, and a diameter of the central opening 437A in the central bearing 437, may each be greater than a largest outer dimension, or diameter, of the central hood frame 446 of the hood structure 440 that passes through theses openings in the central bearing 437 and the upper central bracket 433. This may avoid direct contact between the support structure 430 and the hood structure 440 in this area, isolating the imaging components mounted in the hood structure 440 from any vibration generated due to movement/rotation of the work surface structure 420 supported on the support structure 430.

As noted above, the work surface structure 420 may be rotated relative to the support structure 430 and the hood structure 440 by, for example, a drive system, for example, coupled to the support structure 430 to drive rotation of the work surface structure 420. In some implementations, the drive system may include a motor 410, for example, a stepper motor, coupled to the support structure 430 by a motor mounting structure 412. As the hood structure 440 is physically isolated from the support structure 430, coupling of the motor 410 to the support structure 430 may avoid any transfer or movement or vibration generated by the motor 410 to the hood structure 40 and imagining components mounted thereon.

A rotational force generated by the motor 410 may be transmitted to a driving wheel 414 by, for example, a motor shaft extending from the motor 412 to the driving wheel 414. In some implementations, the driving wheel 414 may contact, for example, the receiving surface 422R of the work surface 422 or the top surface of the rigid outer frame 424 of the work surface structure 420, as shown in FIG. 6A. As the motor 410 drives rotation of the driving wheel 414 and the driving wheel 414 maintains rolling contact with the top outer peripheral portion of, for example, the outer frame 424 of the work surface structure 420, the work surface structure 420 may rotate about its center relative to the support structure 430 due to the mounting of the work surface structure 420 on the support structure 430 by the central bearing 437 and upper central bracket 433.

A plurality of driven wheels 416 may be positioned at distal ends of each of the upper frame members 432 of the support structure 430, as shown in FIGS. 3B and 6B. The driven wheels 416 may be rotatably coupled to the distal ends of the upper frame members 432 to maintain rolling contact with the lower surface of the work surface structure 420, and can freely rotate as the driving wheel 414 rotates the work surface structure 420. The rolling contact of the driven wheels 416 with the lower surface of the work surface structure 420 may provide support for the outer peripheral portion of the work surface structure 420 and facilitate smooth rotation of the work surface structure 420 relative to the support structure 430. In the example shown in FIGS. 3B, 6A and 6B, one driving wheel 414 and three driven wheels 416 are included on the support structure 430. However, other numbers of driven wheels 416 may be provided on the support structure 430 based on, for example, a number of upper frame members 432, a size and an amount of weight carried by the work surface structure 430, a rotational force generated by the motor 410 and transmitted to the work surface structure 420 via the driving wheel 414, and other such factors. In some implementations, contact of the driving wheel 414 and the driven wheels 416 with upper and lower peripheral surfaces of the outer frame 424 of the work surface support 420, rather than directly with the work surface 422, may avoid wear on the work surface 422.

Figure 7:
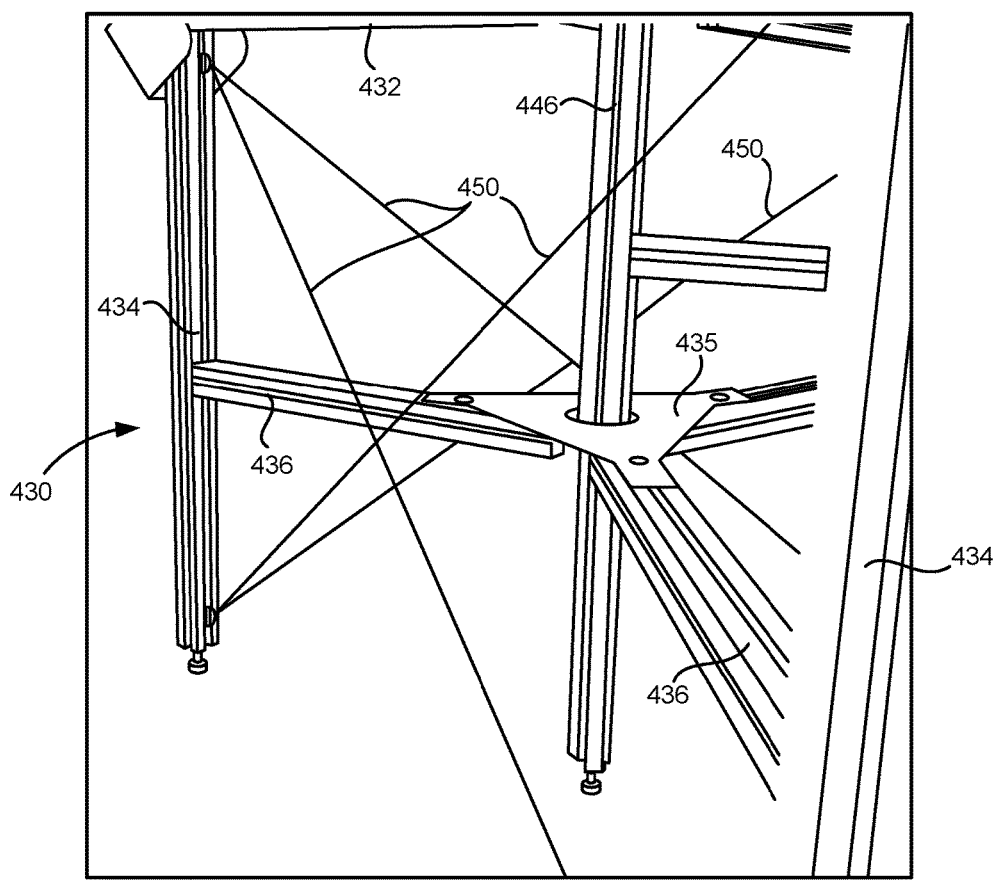
FIG. 7 illustrates a tension support system of a mass digitization system, in accordance with implementations described herein.

As noted above, the hood structure 440 may be physically isolated from the support structure 430 and work surface structure 420 as much as possible, to avoid transfer of movement, vibration and the like generated by movement/rotation of the work surface structure 420 and operation of the motor 410. This physical isolation of the hood structure 440 from the support structure 430 and the work surface structure 420 may be achieved by, for example, sizing the central openings in the work surface 422, the central bearing 437, the upper central bracket 433 and the lower central bracket 435 so that the central openings are larger than the central hood frame 446 extending down through these openings, to avoid direct physical contact between these elements which may otherwise transmit vibration forces. As shown in FIG. 7, in some implementations, tensioning members 450, or cables, may further reinforce the stability of the support structure 430, and further reduce attenuation of vibration.

FIG. 8 is a flowchart of a method 300 of operating a mass digitization system, in accordance with implementations described herein. During operation of the system 100 to digitize a number of different items, for example, archival items, a first item N to be digitized may be received on a work surface that is rotatably mounted on a support structure, to be rotated by a drive system including a motor (block 300). As noted above, numerous items may be received on the work surface. The items, including the first item N, may be positioned on the work surface, for example, by an operator. The work surface may then be rotated (block 310), for example, by a motor. In some implementations, the motor may generate a rotational force for transfer to a driving wheel maintaining rolling contact with a top peripheral edge portion of the work surface to rotate the work surface as the driving wheel rolls along the top peripheral edge of the work surface. In some implementations, one or more driving wheels maintaining rolling contact with a lower peripheral edge portion of the work surface may rotate in response to the rotation of the driving wheel to provide rotational and structural support to the work surface. The motor may be operated either under operator control via the workstation or in an automated manner based on sensor data collected at the imaging station as described above.

This rotation of the work surface may cause the first item N to be moved into position within the digitization area of the imaging station, and within a viewing area of an imaging device, such as a camera, and other imaging components such as, for example, lights and the like, positioned in the digitization area. Once the item is detected, for example, by a light sensor positioned at the imaging station, in the digitization area of the imaging station, and within the viewing area of the imaging device, with proper alignment of the first item with respect to the imaging device confirmed (block 320), the imaging device may capture an image of, or digitize, the first item (block 330). While the first item is being digitized, a second item to be digitized may have been positioned on the work surface, following the first item. After the first item is digitized by the imaging device, the work surface may be rotated to move the first item out of the digitization area. As the work surface rotates, it may be determined, for example, by detection of a subsequent item by a light sensor operating at or near the imaging station, that there are subsequent items to be digitized (block 340). The system may re-initialize the process (block 350) and as the work surface is rotated to move the first item out of the viewing area of the imaging device for removal from the work surface, the second item may move into the viewing area of the imaging device for digitization. This process may be repeated for each item to be digitized or photographed.

As noted above, a variety of different work surface(s) 20, or tables, may be interchangeably mounted on the support structure 30 to accommodate varying sizes, shapes and types of items to be digitized. In some implementations, the work surface(s) 20 may be made of a translucent material, such as, for example, glass, to allow for backlighting of transparent/reflective items such as, for example, glass slides, glass plate negatives and the like. In some implementations, a mat made of an opaque material may be positioned on the translucent work surface 20 to allow for digitization of non-transparent/non-reflective items. In some implementations, the work surface(s) 20 may be made of an opaque material, to minimize reflection and provide for appropriate lighting of non-transparent/non-reflective archival items.

In some implementations, the motor may be programmed to adjust an amount of movement, for example, rotation of the work surface, translating into travel of the item to be digitized. In some implementations, the motor may be controlled by an operator at the workstation. In some implementations, the motor may be automatically controlled based on, for example, information detected by components of the imaging station such as, for example, the laser light source(s) and/or the light sensor(s). In some implementations, the camera, the first light source(s) and/or the second light source(s) may be programmed to adjust an amount of light directed into the digitization area for a particular item to be digitized. In some implementations, an amount of light directed into the digitization area by the light sources(s) may be controlled by an operator at the workstation. In some implementations, an amount of light directed into the digitization area by the light source(s) may be automatically set and adjusted based on characteristics of the item to be digitized detected by, for example, the camera, the light sensor(s) and/or the laser light source(s). In some implementations, registration marks and/or receiving trays may be provided on the work surface for use in properly aligning an item to be digitized in the digitization area. In some implementations, an item with the camera may be automatically brought into optical alignment with the camera in the digitization area based on digital image recognition and/or interruption of a beam generated by the laser light source(s) by a registration mark or a portion of a subsequent item to be digitized. In some implementations, alignment of the image capture area of the camera with respect to the item may be done by an operator at the work station based on a visual indication displayed on a display of the workstation and/or a visual indication generated by the laser light source(s) at the imaging device.

A mass digitization system, in accordance with implementations described herein, may facilitate the rapid capture of cultural heritage material, manuscript materials, photographic materials, and other types of documents, as well as a large variety of other archival type items, not limited to documents or photographs, having varied sizes, shapes, handling requirements, conditions, and the like which cannot be scanned by automated sheet-fed scanners or other large, automated systems. A mass digitization system, as embodied and broadly described herein, may facilitate the digitization of these materials more quickly and efficiently than a flatbed scanner or a copy-stand mounted capture device requiring manual, individual placement and removal, one item at a time.

A mass digitization system, in accordance with implementations described herein, may provide a portable/mobile solution to facilitate the rapid digitization of these types of items in a relatively small space and at a relatively low cost.

A mass digitization system, in accordance with implementations described herein, may protect items being digitized, as the items may be placed on the work surface, or table top, in an open space, rather than directly under a camera and lighting system with restricted movement as in a sheet feed scanner, flat bed scanner or copy stand capture device.

A mass digitization system, in accordance with implementations described herein, may allow for rapid back-lit capture and digitization of transparent and/or reflective media, which cannot be accomplished with other types of capture devices, such as conveyor belt systems and the like. It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to, or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium) for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special-purpose logic circuitry (e.g., an FPGA (field programmable gate array) or an ASIC (application-specific integrated circuit)).

Processors suitable for the processing of a computer program include, by way of example, both general and special-purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices; magnetic disks (e.g., internal hard disks or removable disks); magneto-optical disks; and CD-ROM and DVD-ROM disks. The processor and the memory may be supplemented by, or incorporated in special-purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation), or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A mass digitization system, comprising:
   a support structure;
   a work surface structure rotatably coupled to the support structure;
   a drive system coupled to the support structure and configured to rotate the work surface structure; and
   an imaging station positioned proximate the work surface structure, including:
      a hood structure positioned at a peripheral portion of the work surface structure and extending over a corresponding portion of a top surface of the work surface structure; and
      a cover surrounding the hood structure, such that the hood structure, the cover and the corresponding portion of the top surface of the work surface structure define a digitization area;
      at least one light source selectively emitting light into the digitization area; and
      an imaging device within the digitization area, wherein the imaging device is configured to detect items received on the top surface of the work surface structure within the digitization area as the work surface structure rotates, and to capture images of the detected items.

2. The system of claim 1, wherein the hood structure includes:
   an upper frame member;
   a central frame member extending downward from a first side of the upper frame member and through a central opening in the work surface structure and a central opening in the support structure;
   a lateral frame member extending downward from a second side of the upper frame, opposite the first side of the upper frame, and past an outer periphery of the work surface structure; and
   a mounting frame extending between the lateral frame member and the upper frame member,
   wherein the at least one light source and the imaging device are mounted on the mounting frame.

3. The system of claim 1, wherein the support structure includes:
   a plurality of leg members;
   a first central bracket;
   a plurality of first support members each having a first end coupled to the first central bracket and a second end coupled to a respective leg member of the plurality of leg members;
   a second central bracket aligned with the first central bracket; and
   a plurality of second support members each having a first end coupled to the second central bracket and a second end coupled to a respective leg member of the plurality of leg members.

4. The system of claim 3, further comprising a central bearing coupling providing rotational support between the first central bracket and the work surface structure positioned on the support structure.

5. The system of claim 4, wherein a central support frame of the hood structure extends down through a central opening in the work surface structure, a central opening in the central bearing, a central opening in the first central bracket and a central opening in the second central bracket, and
   wherein a size and cross sectional contour of the central support frame is smaller than a respective size and cross sectional contour of the central opening of each of the work surface structure, the central bearing, the first central bracket and the second central bracket, so as to avoid physical contact between the hood structure and the work surface structure, and to avoid physical contact between the hood structure and the support structure.

6. The system of claim 1, wherein the work surface structure includes:
   a rigid outer frame defining a contour of the work surface structure; and
   a planar work surface, wherein peripheral edge portions of the work surface are coupled in the rigid outer frame.

7. The system of claim 6, wherein the drive system includes:
   a motor coupled to the support structure;
   a driving wheel coupled to a shaft of the motor and configured to rotate in response to a rotational force of the motor; and
   a plurality of driven wheels rotatably coupled to the support structure and configured to rotate in response to rotation of the driving wheel.

8. The system of claim 7, wherein the driving wheel is positioned so as to maintain rolling contact with a top surface of the rigid outer frame of the work surface structure, and the plurality of driven wheels are positioned so as to maintain rolling contact with a bottom surface of the rigid outer frame, and wherein rotation of the driving wheel causes the work surface structure to rotate, and rotation of the work surface structure causes the plurality of driven wheels to rotate.

9. The system of claim 6, wherein the work surface is substantially circular and configured to receive a plurality of items, the plurality of items being sequentially arranged along a circumferential portion of the work surface for image capture.

10. The system of claim 9, wherein the drive system is configured to intermittently rotate the work surface so as to sequentially position the plurality of items in the digitization area for image capture by the imaging device.

11. The system of claim 10, wherein the drive system is configured to:

initiate rotation of the work surface in response to detected completion of image capture by the imaging device of a first item of the plurality of items, and suspend rotation of the work surface in response to detection of a second item of the plurality of items in the digitization area, for image capture of the second item by the imaging device.

12. The system of claim 1, wherein the at least one light source includes:

a first light source coupled to the hood structure and positioned in the digitization area and configured to selectively emit light down onto an item positioned on the top surface of the work surface structure; and a second light source coupled to the hood structure positioned below the work surface structure and configured to selectively emit light up toward the item positioned on the top surface of the work surface structure.

13. The system of claim 12, wherein the work surface structure includes a translucent work surface, and wherein the second light source is configured to selectively emit light up through the translucent work surface and through the item positioned on the top surface of the work surface, so as to backlight the item.

14. The system of claim 1, further comprising at least one laser light source coupled to an outer peripheral portion or an inner peripheral portion of the hood structure and configured to emit a beam down onto the top surface of the work surface structure, the beam defining a visual indicator for alignment of items received on the top surface with the imaging device in the digitization area.

15. The system of claim 1, further comprising a plurality of registration marks on the top surface of the work surface, the plurality of registration marks corresponding to placement positions for items to be received on the top surface of the work surface structure for alignment with the camera in the digitization area.

16. The system of claim 1, further comprising at least one light sensor coupled to an inner peripheral portion of the hood structure and configured to detect at least one of a size or contour of an item in the digitization area for adjustment of the imaging device.

17. A mass digitization system, comprising:

a support structure;

a work surface structure rotatably coupled to the support structure;

a drive system coupled to the support structure and configured to rotate the work surface structure;

an imaging station positioned proximate the work surface structure, including a hood structure positioned at a peripheral portion of the work surface structure and extending over the top surface of the work surface structure so as to define a digitization area together with a corresponding portion of the top surface of the work surface support, the hood structure including:

an upper frame member; and a central frame member extending downward from a first side of the upper frame member and through a central opening in the work surface structure and a central opening in the support structure;

a lateral frame member extending downward from a second side of the upper frame, opposite the first side of the upper frame, and past an outer periphery of the work surface structure; and a mounting frame extending between the lateral frame member and the upper frame member;

at least one light source mounted on the mounting frame; and an imaging device mounted on the mounting frame, wherein the imaging device is configured to detect items received on a top surface of the work surface structure within the imaging station as the work surface structure rotates, and to capture images of the detected items.

18. A mass digitization system, comprising:

a support structure, including:

a plurality of leg members;

a first central bracket;

a plurality of first support members each having a first end coupled to the first central bracket and a second end coupled to a respective leg member of the plurality of leg members;

a second central bracket aligned with the first central bracket; and a plurality of second support members each having a first end coupled to the second central bracket and a second end coupled to a respective leg member of the plurality of leg members;

a work surface structure rotatably coupled to the support structure;

a drive system coupled to the support structure and configured to rotate the work surface structure;

an imaging station positioned proximate the work surface structure; and an imaging device mounted on the mounting frame, wherein the imaging device is configured to detect items received on a top surface of the work surface structure within the imaging station as the work surface structure rotates, and to capture images of the detected items.

* * * * *